(12) United States Patent
Carlson

(10) Patent No.: US 9,321,326 B2
(45) Date of Patent: Apr. 26, 2016

(54) PRESSURE RELIEF VALVE FOR A VEHICLE

(75) Inventor: Daniel D. Carlson, Fenton, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 387 days.

(21) Appl. No.: 13/193,770

(22) Filed: Jul. 29, 2011

(65) Prior Publication Data

US 2012/0192978 A1    Aug. 2, 2012

Related U.S. Application Data

(60) Provisional application No. 61/371,835, filed on Aug. 9, 2010.

(51) Int. Cl.
*B60H 1/26* (2006.01)
*B60H 1/24* (2006.01)
*B60H 1/00* (2006.01)

(52) U.S. Cl.
CPC ............. *B60H 1/249* (2013.01); *B60H 1/26* (2013.01); *B60H 2001/006* (2013.01); *Y10T 137/7891* (2015.04)

(58) Field of Classification Search
CPC ..... B60H 1/249; B60H 1/26; B60H 2001/006
USPC ........... 454/162, 164, 165, 906; 296/208; 137/512, 512.1, 512.15, 855–858
See application file for complete search history.

(56) References Cited

U.S. PATENT DOCUMENTS

| | | | | |
|---|---|---|---|---|
| 3,405,968 A | * | 10/1968 | Feles et al. | 454/164 |
| 4,432,514 A | * | 2/1984 | Brandon | 454/73 |
| 4,691,623 A | * | 9/1987 | Mizusawa | 454/164 |
| 5,601,117 A | | 2/1997 | Lewis et al. | |
| 5,904,618 A | * | 5/1999 | Lewis | 454/162 |
| 6,210,266 B1 | | 4/2001 | Barton | |
| 6,866,576 B2 | * | 3/2005 | Quinn et al. | 454/162 |
| 6,969,314 B2 | * | 11/2005 | Misner | 454/164 |
| 7,517,280 B2 | * | 4/2009 | McConnell et al. | 454/162 |
| 2002/0164943 A1 | | 11/2002 | Misner | |

FOREIGN PATENT DOCUMENTS

| | | |
|---|---|---|
| DE | 102010010927 | 9/2011 |
| EP | 1584508 | 10/2005 |
| GB | 2216072 | 10/1989 |
| JP | 62004622 | 1/1987 |
| JP | 04350446 | 12/1992 |
| WO | 2011/110306 | 9/2011 |

* cited by examiner

*Primary Examiner* — Eric Keasel
(74) *Attorney, Agent, or Firm* — Tarolli, Sundheim, Covell & Tummino LLP

(57) ABSTRACT

A pressure relief valve including a housing that mounts in an aperture in a panel. The housing has a side wall defining an air flow passage. The side wall has a first side wall section at least partially defining the air flow passage. The first side wall section extends at an angle to the panel when the housing is mounted in the aperture in the panel. The first side wall section has an opening extending through the first side wall section. A valve element extends from the first side wall section. The valve element has a closed condition preventing air flow through the opening in the first side wall section and an open condition permitting air flow through the opening in the first side wall section. A louver assembly may be mounted in the aperture in the panel. The louver assembly has at least one louver that directs foreign matter and sound away from the valve element when the valve element is in the closed condition.

9 Claims, 5 Drawing Sheets

PRESSURE RELIEF VALVE FOR A VEHICLE

TECHNICAL FIELD

The present invention is directed to a pressure relief valve for an opening in a motor vehicle and more specifically, to a pressure relief valve in which a valve element is protected from damage by foreign matter entering the valve and reduces sound passing through the pressure relief valve.

BACKGROUND OF THE INVENTION

Pressure relief valves are widely used in motor vehicles to relieve air pressure surges or peaks in the passenger compartment which result for example, when the doors are slammed shut or an airbag is inflated. The valves generally comprise a simple rigid frame or housing which mounts in an aperture in a vehicle body panel. A wall of the housing extending generally parallel to the vehicle body panel has an opening through which air may pass. A valve element in the form of a normally flexible plastic flap is connected to the housing to overlie the opening in the housing wall. The valve element opens relative to the housing to uncover the opening to relieve air pressure surges. The pressure relief valve may include louvers that cover the valve element to make the pressure relief valve more visually pleasing.

SUMMARY OF THE INVENTION

The present invention is directed to a pressure relief valve including a housing that mounts in an aperture in a panel. The housing has a side wall defining an air flow passage. The side wall has a first side wall section at least partially defining the air flow passage. The first side wall section extends at an angle to the panel when the housing is mounted in the aperture in the panel. The first side wall section has an opening extending through the first side wall section. A valve element extends from the first side wall section. The valve element has a closed condition preventing air flow through the opening in the first side wall section and an open condition permitting air flow through the opening in the first side wall section.

In another aspect of the present invention a pressure relief valve includes a housing that mounts in an aperture in a panel. The housing has a side wall defining an air flow passage. A valve element has a closed condition preventing air flow through the air flow passage and an open condition permitting air flow through the air flow passage. A louver assembly is mounted in the aperture in the panel. The louver assembly has at least one louver that directs foreign matter and sound away from the valve element when the valve element is in the closed condition.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
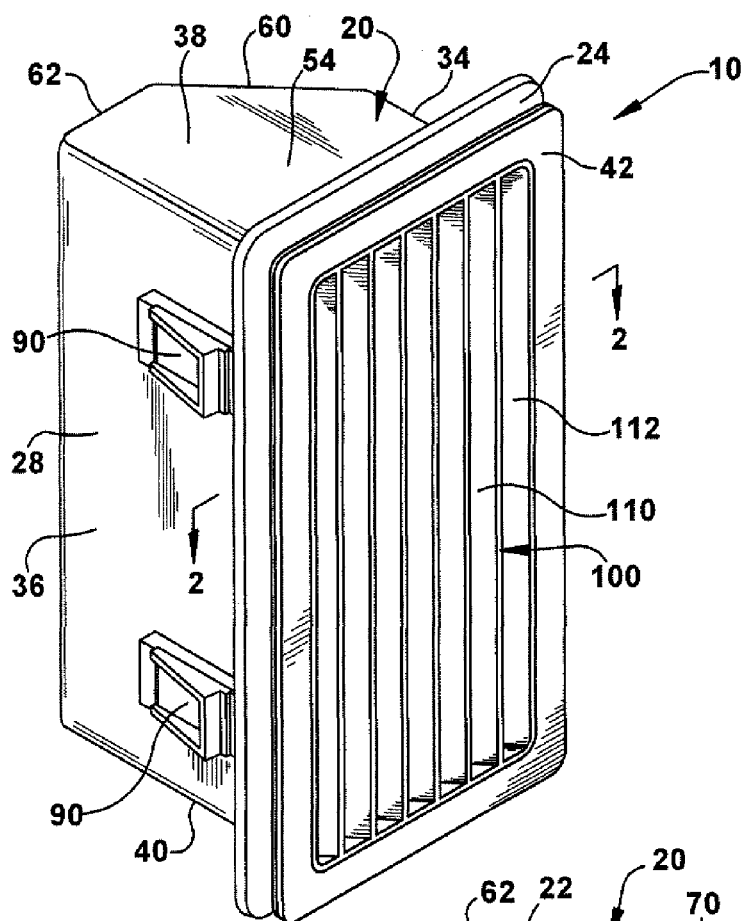
FIG. 1 is a schematic pictorial illustration of a first exemplary embodiment of a pressure relief valve constructed in accordance with the present invention.
Figure 2:
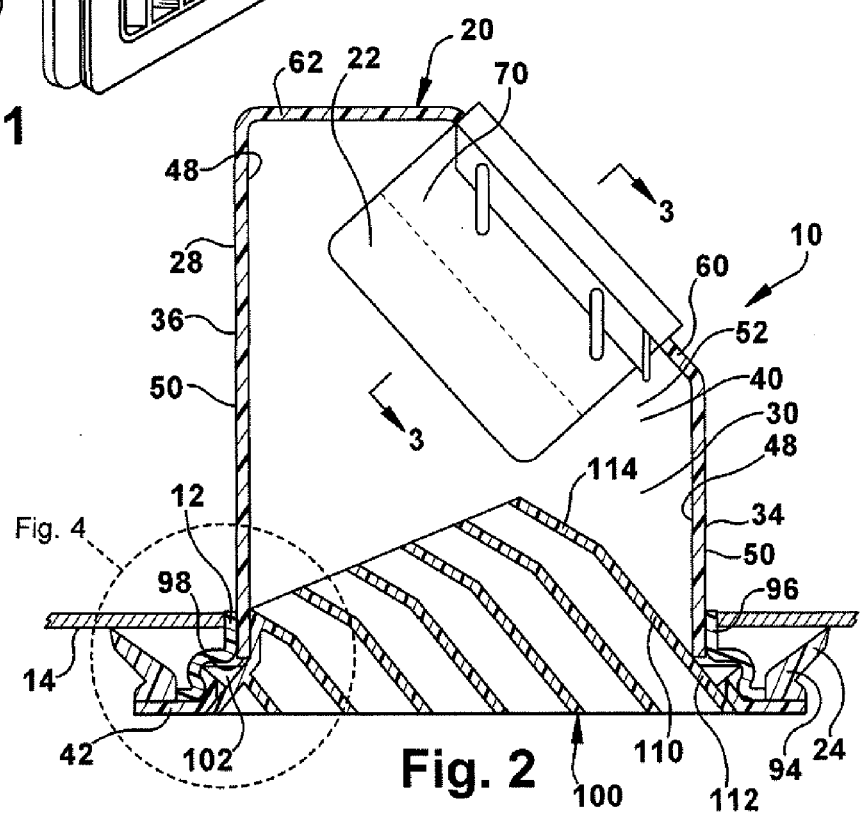
FIG. 2 is a schematic sectional view of the pressure relief valve of FIG. 1 taken along the line 2-2.

The present invention is directed to a pressure relief valve for a vehicle and more particularly, is directed to a pressure relief valve for an opening in a base, such as a panel in a motor vehicle. FIGS. 1 and 2 show an exemplary embodiment of a pressure relief valve 10 to be located in an aperture 12 of a body panel 14 of a motor vehicle constructed in accordance with the present invention. The pressure relief valve 10 may be located in the area of the vehicle trunk that is connected to the passenger compartment.

As shown in FIG. 2, the pressure relief valve 10 includes a housing 20, at least one flap valve element 70, and a seal 24. Although the housing 20 is illustrated as having a generally rectangular construction, it should be understood that the housing can have any geometry including, for example, square, triangular, polygonal, elliptical, circular, etc. The housing 20 (FIG. 3) includes a peripheral side wall 28 that extends around the perimeter of the housing and defines a central air flow passage 30. The central air flow passage 30 connects a passenger compartment of the vehicle with the atmosphere outside the vehicle and establishes an equalized air pressure between the passenger compartment and the atmosphere (FIG. 1).

The side wall 28 of the housing 20 includes a plurality of side wall sections connected together. First and second longer side wall sections 34, 36 extend parallel to each other. First and second shorter side wall sections 38, 40 extend parallel to each other and perpendicular to the first and second longer side wall sections 34, 36. A flange 42 extends outwardly from the side walls 34, 36, 38, 40 and substantially perpendicular to the side walls. The seal 24 is connected to the flange 42. The seal 24 (FIG. 2) extends from the flange 42 into engagement with the panel 14 when the pressure relief valve 10 is connected to the panel.

Each of the first and second longer side wall sections 34, 36 has inner and outer surfaces 48, 50 spaced apart from each other. Likewise, each of the first and second shorter side wall sections 38, 40 has inner and outer surfaces 52, 54 spaced apart from each other. The inner surfaces 52 of the shorter side wall sections 38, 40 cooperate with the inner surfaces 48 of the longer side wall sections 34, 36 to define the airflow passage 30 through the housing 20.

The housing further includes a side wall section 60 (FIG. 2) extending from the longer side wall section 34. The side wall section 60 extends at an angle to the side wall section 34. The side wall section 60 also extends at an acute angle to the panel 14 when the pressure relief valve is connected to the panel. A side wall section 62 extends between the side wall section 60 and the side wall section 36. The side wall section 62 extends generally perpendicular to the longer side wall sections 34, 36 and generally parallel to the panel 14 when the pressure relief valve is connected to the panel 14.

Figure 3:
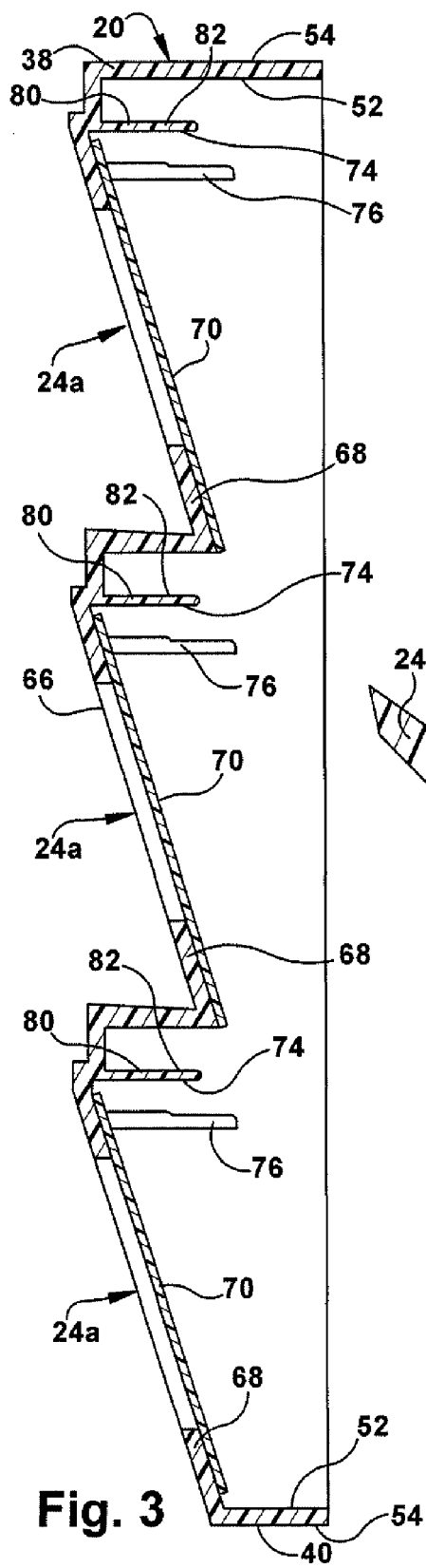
FIG. 3 is a schematic sectional view of the pressure relief valve of FIG. 2 taken along the line 3-3.
Figure 4:
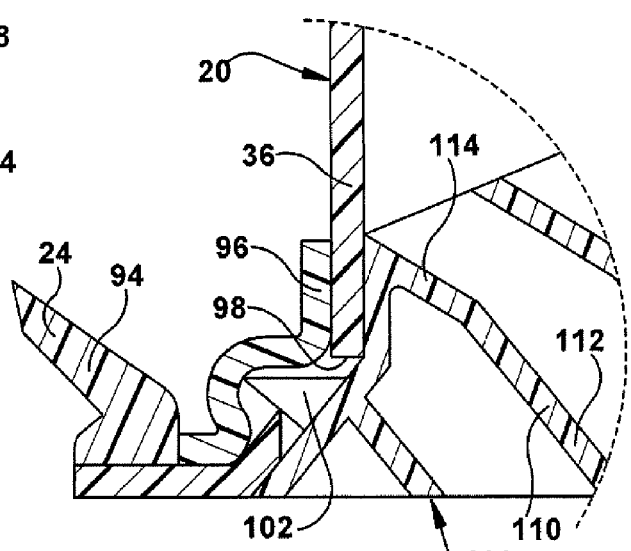
FIG. 4 is an enlarged view of a portion of the pressure relief valve of FIG. 2.

The side wall section 60 includes one or more internal sub-frame assemblies or members 66 that are positioned to extend transversely relative to the side walls 34, 36, 38, 40, 62 of the housing, as shown in FIG. 3. Each sub-frame 66 has a generally rectangular construction that defines a flow opening 24a in the side wall section 60 of the air flow passage 30. Although three sub-frame assemblies 66 and corresponding flow openings 24a are illustrated, those having ordinary skill will appreciate that there could be more or fewer sub-frames and corresponding flow openings.

The sub-frames 66 are integrally formed with the housing 20 and lie at the angle shown relative to the side wall sections 38, 40. Each sub-frame 66 includes a planar valve seat defining portion 68. A flexible valve flap element 70 is connected to each sub-frame 66 and is sized to engage peripherally about the flow opening 24a in the associated sub-frame. The flap element 70 selectively engages the seat portion 68 to overlie, and thereby close, the associated flow opening 24a. FIG. 3 illustrates the flap elements 70 in the closed position. Together, the sub-frame(s) 66 and the flap element(s) 70 block the entire central air flow passage 30.

As shown in FIG. 3, retainer bars 74 on the frame 20 and retainer pins 76 on the sub-frame 66 cooperate to secure each flap element 70 to the associated sub-frame in a known manner. The retainer pins 76 extend away from the sub-frame 66 and are spaced along the sub-frame. The retainer bar 74 is a plastic bar member of relatively rigid construction integrally molded with the frame 20. Those having ordinary skill will appreciate that the retainer bar 74 may have a unitary construction or constitute a series of discrete portions.

The retainer bar 74 includes a first end 80 integrally molded with the frame 20 and a second end 82 having slot-like orifices corresponding to the location and spacing of the associated retaining pins 76 extending from the sub-frame 66. Each of the orifices is sized to receive one of the retaining pins 76.

The retainer bar 74 has a first, initial condition in which the first end 80 and the second end 82 extend substantially parallel to the shorter side wall sections 38, 40 of the frame 20 and a second condition in which the second end of the retainer bar extends transverse to the shorter side wall sections of the housing. By placing the retainer bar 74 in the second condition, the retainer bar secures the flap element 70 to each sub-frame 66.

Once the pressure relief valve 10 is inserted and installed within the body panel 14 of the vehicle, when an over-pressure condition exists on the left or upstream side of the flap elements 70, the flap elements are pivoted away from the associated seat portion 68 of the sub-frame 66 to an open condition, shown in solid line in FIG. 2. The open condition of the flap elements 70 uncovers the flow openings 24a on the sub-frame 66 to allow the flow of air to take place freely from the upstream to the downstream side of the valve 10 so that air flows from the passenger compartment to the atmosphere.

If the pressures on the upstream and downstream sides balance or a downstream over-pressure condition results, the flap elements 70 pivot back into engagement with the seat portions 68 of the sub-frame 66 to a closed condition under the force of gravity or because of the increased downstream pressure. This closes the flow openings 24a and, thus, prevents airflow through the valve 10. It is contemplated that the valve elements 70 may move between the closed and open conditions in any desired manner, such as using actuators or springs to move the valve elements.

The pressure relief valve 10 (FIG. 1) includes at least one latch member 90 for securing the pressure relief valve to the opening in the body panel 14 of the vehicle. The latch members 90 extend from the outer surface 50 of the first and second longer side walls 34, 36. Although two latch members are illustrated on each longer side wall, those having ordinary skill will appreciate that more or fewer latch members may be positioned along the longer side walls 34, 36 and/or the shorter side walls 38, 40.

The latch members 90 snap outward in a known manner to engage the inner surface of the body panel 14 while the seal 24 on the flange 42 engages the outer surface of the body panel, thereby securing the valve 10 to the body panel.

As the valve 10 is inserted into the opening 12 in the body panel 14, the seal 24 is forced into contact with the body panel at an area peripherally adjacent the side walls 34, 36, 38, 40 of the housing 20. As the latch elements 90 move into the latching position, the seal 24 is forced to spread outwardly and parallel relative to the body panel 14. The function of the seal 24 is to help seal the connection between the pressure relief valve 10 and the body panel 14 of the vehicle against air, water, dust, and foreign matter from passing through the opening 12 in the body panel except through the central air passage 30.

The seal 24 may include a first portion 94 and a second portion 96. The first portion 94 is connected with the flange 42 of the housing 20. The first portion 94 extends from the flange 42 into engagement with the panel 14. The second portion 96 of the seal extends from the flange 42 to the side wall sections 34, 36, 38, 40 of the housing 20. The second portion 96 engages the inner surface of the panel 14 defining the opening 12. The second portion 96 may extend over openings 98 formed in the transition region between the flange 42 and the side wall sections 34, 36, 38, 40. The openings 98 are for connecting a louver assembly 100 to the housing 20.

The louver assembly 100 has projections or latch members 102 that extend into the openings 98 to snap the louver assembly 100 to the housing 20. The latch members 102 engage the second portion 96 of the seal 24 when the louver assembly 100 is connected to the housing 20. The second portion 96 deforms and extends over the openings 98 and the latch members 102 to help prevent air, water, dust, and foreign matter from passing through the openings 98.

The louver assembly 100 includes a plurality of louvers 110. The louvers 110 direct air, sound waves, water, dust and foreign matter that enters the pressure relief valve 10 from the exterior of the panel 14 away from the valve elements 70 and the openings 24a in the side wall section 60. The louvers 110 have first portions 112 located adjacent the panel 14 and extending at a first acute angle to the panel 14 when the louver assembly 100 is connected to the housing 20. The louvers 110 have second portions 114 spaced from the panel 14 that extend at a second acute angle to the panel 14 when the louver assembly is connected to the housing 20. The second acute angle is smaller than the first acute angle. Accordingly, the second portions 114 extend at an angle to the first portions 112. The first portions 112 may extend generally parallel to the side wall section 60 with the openings 24a.

The louvers 110 help protect the valve elements 70 from damage by directing foreign matter, such as pressurized water that may be directed at the pressure relief valve when the vehicle is washed, away from the valve elements. The louvers 110 direct foreign matter entering the pressure relief valve 10 toward the side wall section 36, which is spaced from the valve elements 70. The louvers 110 direct foreign matter away from the valve elements 70 when the valve elements are in the closed condition as shown in dotted lines in FIG. 2 as well as when the valve elements are in the open condition and shown in solid lines in FIG. 2. The louvers 110 also direct sound waves entering the pressure relief valve 10 from outside the panel 14 away from the valve elements 70 and the openings 24a in the side wall section 60 to reduce the noise that enters the vehicle compartment through the pressure relief valve.

The exemplary embodiment of the pressure relief valve 10 illustrated in FIGS. 1-4 has a louver assembly 100 that directs foreign matter away from the valve elements 70 when the valve elements are open or closed. The exemplary embodiments illustrated in FIGS. 5 and 6 have louver assemblies that direct foreign matter away from the valve elements only when the valve elements are in a closed condition. Since the embodiments of the invention illustrated in FIGS. 5 and 6 are generally similar to the embodiment of the invention illustrated in FIGS. 1-4, similar numerals will be utilized to designate similar components.

Figure 5:
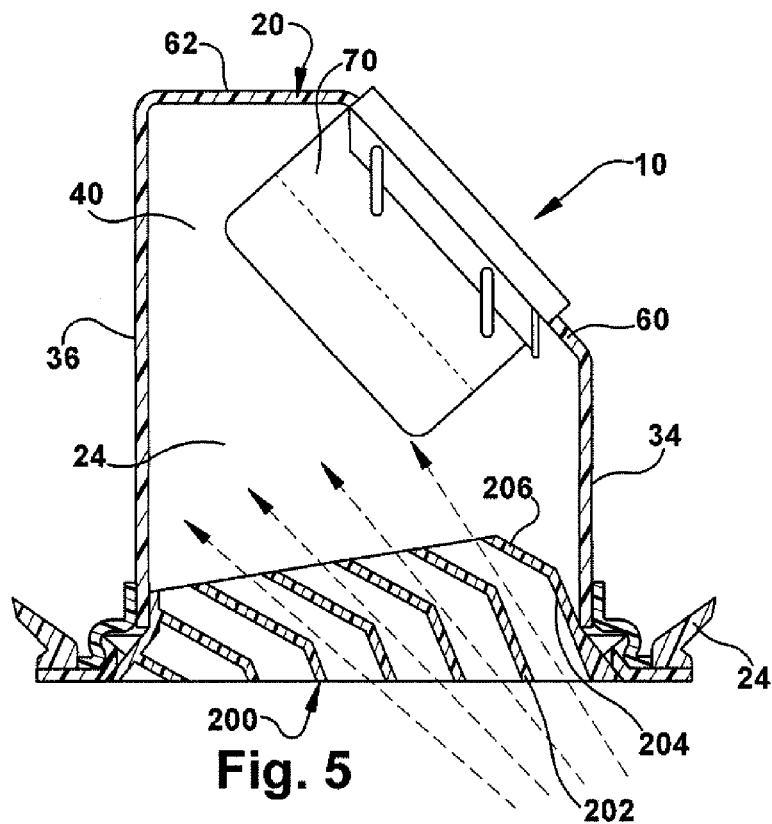
FIG. 5 is a schematic sectional view of a second exemplary embodiment of a pressure relief valve constructed in accordance with the present invention.

The pressure relief valve 10 illustrated in FIG. 5 includes a louver assembly 200 that directs foreign matter, such as pressurized water, and sound waves away from the valve elements 70 and the openings 24a in the side wall section 60. The louver assembly 200 includes louvers 202. The louvers 202 have first portions 204 that extend at a first acute angle relative to the panel (not shown) when the pressure relief valve 10 is connected with the panel. The louvers 202 have second portions 206 that extend at a second acute angle to the panel when the pressure relief valve is connected with the panel. The second angle is smaller than the first angle.

The louvers 202 extend into the housing 20 a distance smaller than the distance that the louvers 110 of the embodiment illustrated in FIGS. 1-4 extend into the housing. Accordingly, the louver 202 nearest the side wall section 34 may permit foreign matter, indicated by the arrows, to impact the valve elements 70 when the valve elements are in the open condition, shown in solid lines in FIG. 5, but direct foreign matter away from the valve elements 70 when in the closed condition, shown in dotted lines in FIG. 5. The other louvers 202 direct foreign matter away from the valve elements 70 when the valve elements are in the closed condition or the open condition. The louvers 202 also direct sound waves away from the openings 24a in the side wall section 60.

Figure 6:
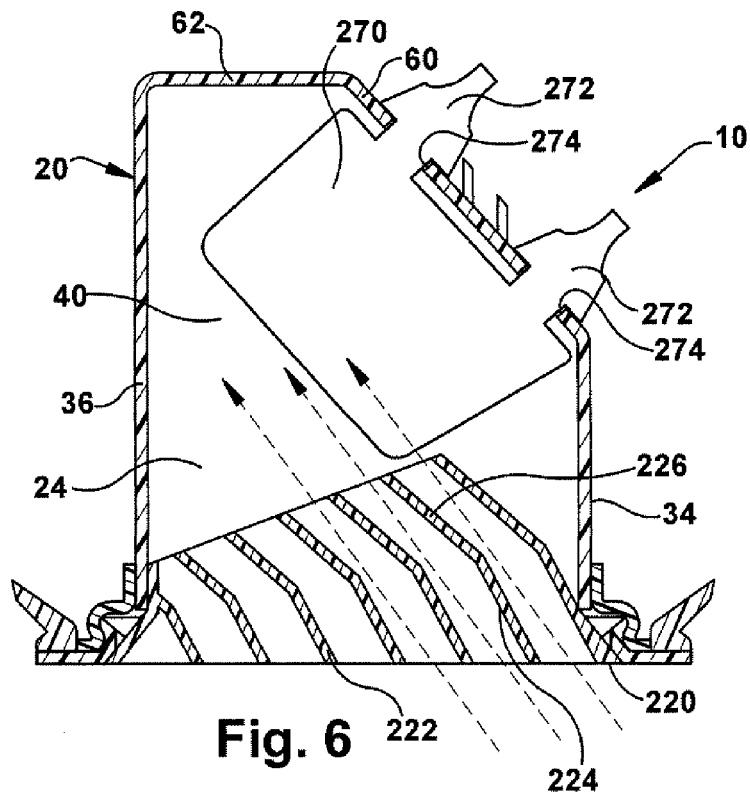
FIG. 6 is a schematic sectional view of another exemplary embodiment of a pressure relief valve constructed in accordance with the present invention.

The pressure relief valve 10 illustrated in FIG. 6 includes a louver assembly 220 that directs foreign matter, such as pressurized water, and sound waves away from the valve elements 270 and openings in the side wall section 60. The valve elements 270 are connected to the housing 20 in a different manner than the valve elements 70 of the embodiment of FIGS. 1-4. The valve elements 270 include tabs 272 that extend through openings 274 in the housing 20. The tabs connect the valve elements 270 to the housing 20. It is contemplated that the valve elements 270 may be connected to the housing 20 in any desired manner.

The louver assembly 220 includes louvers 222. The louvers 222 have first portions 224 that extend at a first acute angle relative to the panel (not shown) when the pressure relief valve 10 is connected with the panel. The louvers 222 have second portions 226 that extend at a second acute angle to the panel when the pressure relief valve is connected with the panel. The second angle is smaller than the first angle.

The first portions 224 of the louvers 222 extend into the housing 20 a distance smaller than the distance that the first portions 112 of the louvers 110 of the embodiment illustrated in FIGS. 1-4 extend into the housing. Accordingly, the louvers 222 nearest the side wall section 34 may permit foreign matter, indicated by the arrows, to impact the valve elements 270 when the valve elements are in the open condition, shown in solid lines in FIG. 6, but direct foreign matter away from the valve elements 270 when in the closed condition, shown in dotted lines in FIG. 6. The other louvers 222 direct foreign matter away from the valve elements 270 when the valve elements are in the closed condition or the open condition. The louvers 222 direct sound waves away from the openings in the side wall section 60.

The exemplary embodiments of the pressure relief valve 10 illustrated in FIGS. 1-6 have valve elements that are generally rectangular. The exemplary embodiment illustrated in FIG. 7 has a valve element 370 with a shape that is not rectangular. Since the embodiment of the invention illustrated in FIG. 7 is generally similar to the embodiment of the invention illustrated in FIGS. 1-6, similar numerals will be utilized to designate similar components.

Figure 7:
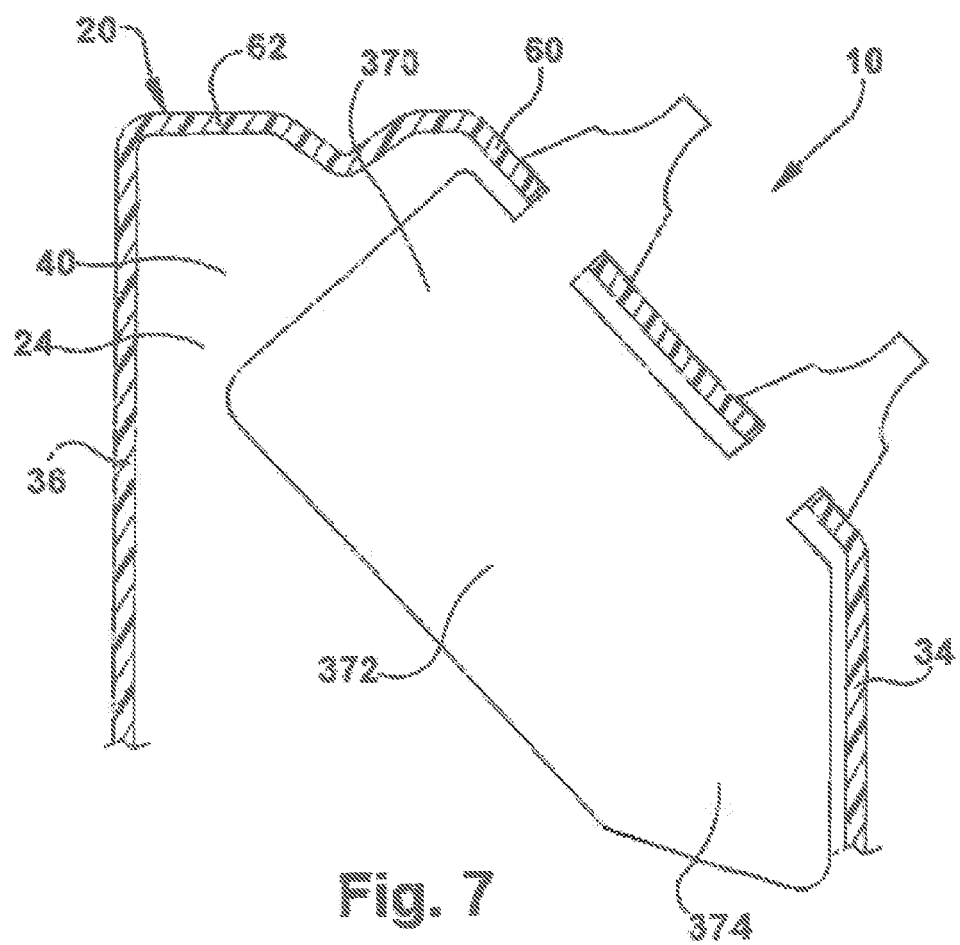
FIG. 7 is a schematic sectional view of another exemplary embodiment of a pressure relief valve constructed in accordance with the present invention.

The valve element 370 illustrated in FIG. 7 has a first, rectangular portion 372 and a second, triangular portion 374 extending from the rectangular portion toward the side wall section 34. The first portion 372 closes a rectangular portion of the opening (not shown) extending through the side wall section 60 of the housing 20. The second portion 374 of the valve element 370 covers a triangular portion (not shown) of the opening that extends through the side wall section 34. Accordingly, the embodiment illustrated in FIG. 7 has a larger opening extending through the housing 20 than the openings 24a illustrated in the embodiment of FIGS. 1-4.

The exemplary embodiment of the pressure relief valve 10 illustrated in FIGS. 1-4 has a side wall section 60 to which the valve elements 70 are connected that extends at an acute angle to the panel when the pressure relief valve is connected to the panel. The exemplary embodiment illustrated in FIG. 8 has a side wall section 460 to which valve elements are connected that extends generally perpendicular to the panel. Since the embodiment of the invention illustrated in FIG. 7 is generally similar to the embodiment of the invention illustrated in FIGS. 1-4, similar numerals will be utilized to designate similar components.

The housing 20 has a side wall section 460 extending generally perpendicular to the panel (not shown) when the pressure relief valve 10 is connected to the panel. The side wall section 460 extends generally parallel to the side wall section 36. The valve element 70 is connected with the side wall section 460 and moves between open and closed conditions to permit air flow through the air flow passage 30. An end wall section 462 extends between the side wall sections 36, 460. The end wall section 462 extends generally perpendicular to the side wall sections 36, 460.

A sound absorber 466 is connected with the side wall section 36 and end wall section 462. The sound absorber 466 may be connected to the housing in any desired manner. The sound absorber 466 extends from the side wall sections 36 and 462 into the air flow passage 30. The sound absorber 466 has a first portion 468 that extends from adjacent the panel (not shown) when the pressure relief valve is connected to the panel to the end wall section 462. A second portion 470 of the sound absorber 466 extends along the end wall section 462 from the side wall section 36 toward the side wall section 460. The length of the second portion 470 is such that the second portion is spaced from the valve elements 70 when the valve elements are in the open condition, as shown in FIG. 8.

Figure 8:
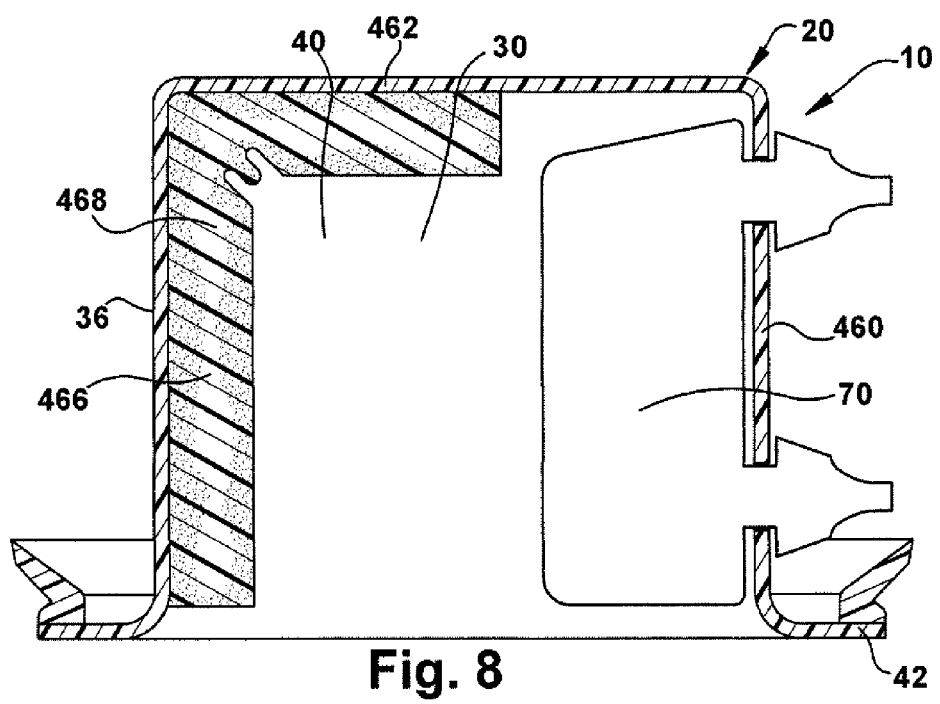
FIG. 8 is a schematic sectional view of another exemplary embodiment of a pressure relief valve constructed in accordance with the present invention.
Figure 9:
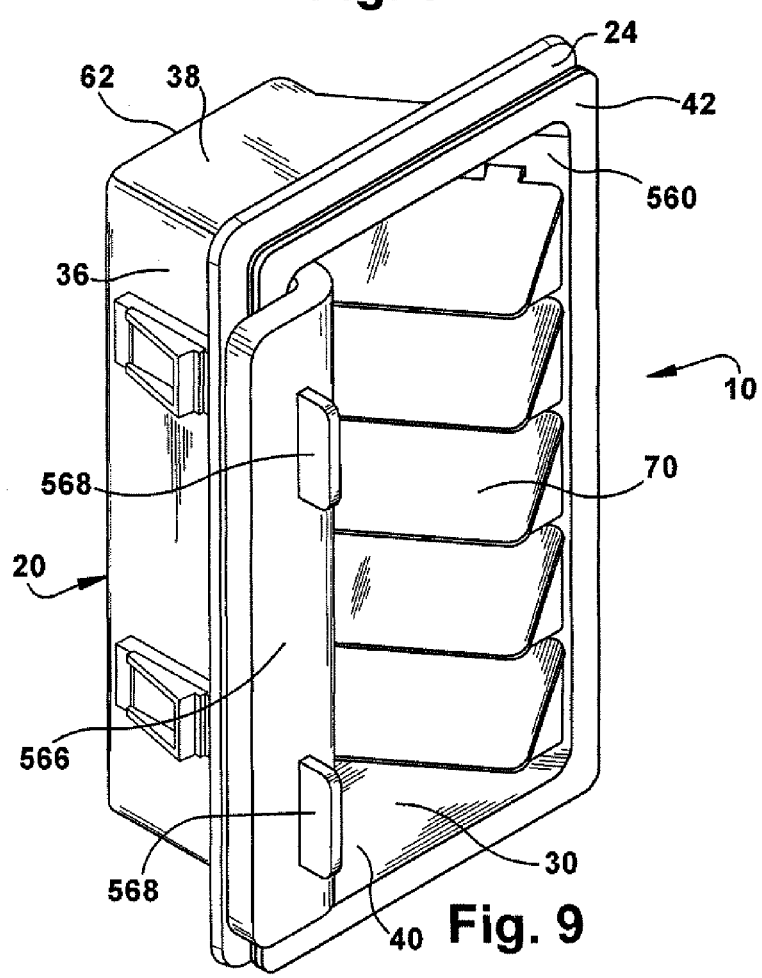
FIG. 9 is a schematic sectional view of another exemplary embodiment of a pressure relief valve constructed in accordance with the present invention.

The exemplary embodiment of the pressure relief valve 10 illustrated in FIG. 8 has a side wall section 460 extending generally perpendicular to the panel when the pressure relief valve is connected to the panel. The exemplary embodiment illustrated in FIG. 9 has a side wall section extending at an acute angle to the panel when the pressure relief valve is connected to the panel. Since the embodiment of the invention illustrated in FIG. 9 is generally similar to the embodiment of the invention illustrated in FIG. 8, similar numerals will be utilized to designate similar components.

The housing 20 (FIG. 8) has a side wall section 560 extending at an acute angle to the panel (not shown) when the pressure relief valve is connected to the panel. The valve elements 70 are connected with the side wall section 560 and move between open and closed conditions to permit air flow through the air flow passage 30.

A sound absorber 566 is connected with the side wall section 36. The sound absorber 566 extends from the side wall section 36 into the air flow passage 30. The sound absorber 566 may have a portion that extends along the side wall section 62 from the side wall section 36 toward the side wall section 560. The sound absorber has openings or slots through which projections 568 on the flange 42 of the housing 20 extend to help connect the sound absorber 566 to the housing 20.

It is contemplated that a sound absorbing member may be connected to the housing and extend into the air flow passage of the exemplary embodiments illustrated in FIGS. 1-7.

From the above description of the invention, those skilled in the art will perceive improvements, changes and modifications. Such improvements, changes and modifications within the skill of the art are intended to be covered by the appended claims.

Having described the invention, the following is claimed:

1. A pressure relief valve comprising:
a housing that mounts in an aperture in a portion of a panel, said portion of said panel lying in a plane, said housing having a side wall defining an air flow passage, said side wall having a first side wall section, a second side wall section, and a third side wall section, said first, second, and third side wall sections at least partially defining said air flow passage, said first side wall section extending at an angle to the panel when said housing is mounted in the aperture in the panel, said first side wall section having an opening extending through said first side wall section, said second and third side wall sections extending generally parallel to each other and perpendicular to said plane in which the portion of the panel lies when said housing is mounted in the aperture of the panel, said first side wall section extending obliquely to said second and third side wall sections; and
a valve element extending from said first side wall section, said valve element having a closed condition preventing air flow through the opening in said first side wall section and an open condition permitting air flow through the opening in the first side wall section, said valve element pivoting between the closed condition and the open condition about an axis extending at an angle relative to said plane in which said portion of said panel lies.

2. The pressure relief valve as set forth in claim 1 wherein said first side wall section extends at an acute angle to the plane in which the portion of the panel lies when said housing is mounted in the aperture in the panel.

3. The pressure relief valve as set forth in claim 1 wherein said housing includes a fourth side wall section at least partially defining said air flow passage and extending generally perpendicular to said second and third side wall sections, said first side wall section extending between said fourth and second side wall sections.

4. The pressure relief valve as set forth in claim 1 further including a louver assembly mounted in the aperture in the panel, said louver assembly having at least one louver that directs foreign matter and sound waves away from said first side wall section of said housing.

5. The pressure relief valve as set forth in claim 4 wherein said at least one louver includes a first portion located adjacent the panel and extending at a first angle to the panel when said louver assembly is mounted in the aperture in the panel and a second portion spaced from the panel and extending at a second angle to the panel when said louver assembly is mounted in the aperture in the panel, said second angle being different than said first angle.

6. The pressure relief valve as set forth in claim 5 wherein said first angle is larger than said second angle.

7. The pressure relief valve as set forth in claim 4 wherein said louver assembly includes a latching member for snapping into a louver opening in said housing.

8. The pressure relief valve as set forth in claim 7 wherein a seal extends over said louver opening in said housing, said latching member on said louver assembly engaging said seal when said louver assembly is connected with said housing.

9. The pressure relief valve as set forth in claim 1 wherein a sound absorbing member is connected with said housing and is located within said air flow passage.

* * * * *